(12) United States Patent
Kavasseri

(10) Patent No.: US 7,293,052 B1
(45) Date of Patent: Nov. 6, 2007

(54) METHOD AND APPARATUS FOR VALUE-BASED ACCESS TO NETWORK MANAGEMENT INFORMATION

(75) Inventor: Ramanathan Kavasseri, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 772 days.

(21) Appl. No.: 10/279,421

(22) Filed: Oct. 23, 2002

(51) Int. Cl.
G06F 15/16 (2006.01)

(52) U.S. Cl. ............... 708/229; 709/203; 709/212; 709/216; 709/223; 709/226; 707/6; 707/9; 707/10

(58) Field of Classification Search ............ 709/203, 709/212, 216–220, 223–226, 22; 707/6, 707/9, 10
See application file for complete search history.

(56) References Cited

U.S. PATENT DOCUMENTS

| | | | | |
|---|---|---|---|---|
| 5,999,179 | A * | 12/1999 | Kekic et al. | 715/734 |
| 6,038,563 | A * | 3/2000 | Bapat et al. | 707/10 |
| 6,085,191 | A * | 7/2000 | Fisher et al. | 707/9 |
| 6,236,996 | B1 * | 5/2001 | Bapat et al. | 707/9 |
| 6,292,829 | B1 * | 9/2001 | Huang et al. | 709/223 |
| 6,516,318 | B2 * | 2/2003 | Nakamura et al. | 707/10 |
| 6,694,304 | B1 * | 2/2004 | Sethi | 707/2 |
| 6,728,768 | B1 * | 4/2004 | Carney | 709/224 |
| 6,981,038 | B2 * | 12/2005 | McKenzie et al. | 709/223 |
| 7,099,947 | B1 * | 8/2006 | Nadeau et al. | 709/229 |

OTHER PUBLICATIONS

B. Wijnen et al., "View-based Access Control Model (VCAM) for the Simple Network Managment Protocol (SNMP)," Network Working Group, Request for Comments: 2575, Apr. 1999, http://www.ietf.orf/rfc/rfc2575.txt., printed Aug. 8, 2002, pp. 1-36.

D. Harrington et al., "An Architecture for Describing SNMP Management Frameworks," Network Working Group, Request for Comments: 2571, Apr. 1999, http://www.ietf.orf/rfc/rfc2571.txt, printed Aug. 1, 2002, pp. 1-58.

Cisco Systems, Inc., "Internetworking Technologies Handbook, Third Edition," 2001, Chapter 56, pp. 5-1-56-12.

* cited by examiner

Primary Examiner—Saleh Najjar
Assistant Examiner—Shawki S Ismail
(74) Attorney, Agent, or Firm—Hickman Palermo Truong & Becker LLP

(57) ABSTRACT

In one aspect, a message is received requesting access to a set of managed objects associated with a network device. A set of object instances associated with the objects is retrieved, with their associated values. A set of access configuration commands represent an access policy associated with the requester. The access policy specifies restricted values associated with an object instance and includes instructions regarding whether to permit or deny access to the object instance when the object instance contains a specified restricted value. The current value of the object instance is compared to the specified restricted values, and access is controlled based on the access policy. Significantly, value-based access to management information is provided. In an embodiment, the set of commands further specify operator and restricted value combinations associated with the object instance, which are compared with the current value to determine whether it meets the state of one of the combinations, and access is permitted or denied accordingly.

63 Claims, 4 Drawing Sheets

METHOD AND APPARATUS FOR VALUE-BASED ACCESS TO NETWORK MANAGEMENT INFORMATION

FIELD OF THE INVENTION

The present invention generally relates to communication networks. The invention relates more specifically to a method and apparatus for value-based access to network management information.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network Management

A managed network typically consists of managed devices, agents and network-management systems (NMSs). A managed device is a network node that includes a management protocol agent and resides on a managed network. Managed devices collect and store management information and make this information available to NMSs using a suitable network management protocol, such as the Simple Network Management Protocol (SNMP). Examples of managed devices include routers, access servers, switches, bridges, hubs, computer hosts, and printers. Examples of management information include configuration parameters and performance statistics.

An agent is a network management software module that resides in a managed device, and has local knowledge of management information and translates the information to a form compatible with a management protocol. An NMS executes applications that monitor and control managed devices, and provide the bulk of the processing and memory resources required for network management. One or more NMSs exist on any managed network.

Simple Network Management Protocol

The Simple Network Management Protocol (SNMP) is an application layer protocol that facilitates the exchange of management information between network devices. SNMP is part of the TCP/IP protocol suite, and is currently the de facto network management protocol used in the Internet community. SNMP enables network administrators to manage network performance, discover and solve network problems, and plan for network growth, for example.

An SNMP MIB (Management Information Base) is a collection of information that is organized hierarchically. MIBs are accessed using a network management protocol such as SNMP, and are comprised of managed objects, which are identified by object identifiers (OIDs). A managed object, sometimes referred to as a MIB object or simply a MIB, stores a value for one of any number of specific characteristics of a managed device. Managed objects are comprised of one or more object instances, which are essentially variables. A variable binding associates a particular object instance with its current value. An OID uniquely identifies a managed object in a MIB hierarchy. Users can define private branches of the MIB hierarchy that include managed objects for their own products. For example, a managed object, atInput, can be uniquely identified either by the object name, iso.identified—organization.dod.internet.private.enterprise.cisco.temporaryvariables.AppleTald.atInput, or by the equivalent OID, 1.3.6.1.4.1.9.3.3.1.

The Structure of Management Information (SMI) defines the rules for describing management information, using Abstract Syntax Notation One (ASN.1). The SNMPv1 SMI is defined in IETF Request for Comments (RFC) 1155 and the SNMPv2 SMI is described in IETF RFC 1902. The SNMPv1 SMI defines highly structured tables that are used to group the instances of a tabular object, that is, an object that contains multiple variables.

SNMP is a simple request/response protocol, through which a network management system issues request messages which are referred to as Protocol Data Units (PDU), and managed devices return responses. A protocol operation, Get, is used by an NMS to retrieve the value of one or more object instances from an agent. Another operation, Set, is used by an NMS to set values of object instances within an agent.

For security reasons, it is often important to be able to restrict the access rights of groups of users to only a subset of the management information in the management domain. This capability is provided via a MIB view, which details a specific set of managed object types and, optionally, specific instances of object types, that are accessible for read, write and notify operations. Typically, the rights to access management information, which is controlled through views, are associated with a given context. Contexts refer to multiple instances of a MIB space that co-exist simultaneously. Hence, access to an instance of a collection of management information by an SNMP entity is controlled through the use of view/context associations.

For example, an SNMP data structure called "vacmAccessEntry" associates a "contextName" to a "readview+writeview+notifyview" tuple. This association can be used to determine if an object instance is present within the given context and, if an object instance is present, whether it is visible in the read, write or notify viewname. One MIB view/context name association may specify access rights to all of the management information in that context and, often, there may also be other MIB view/context name associations, each of which specifies access rights to a subset of the management information. Therefore, a group's access to management information can be restricted in a desired manner by specifying the group's rights in terms of the particular MIB view that the group can access within an associated context.

At present, a View-based Access Control Model for SNMP, as described in IETF RFC 2575, is used to determine access rights of a given group of users. A group's access rights are given by a read-view, write-view and a notify-view. The read-view represents the set of object instances authorized for the group when reading objects, such as when processing a retrieval operation. Similarly, the write-view represents the set of object instances authorized for the group when writing objects, such as when processing a write operation.

Significantly, a prior approach to controlling access to network management information via SNMP provides access control at the MIB level only. For example, with devices of Cisco Systems, Inc. that run Internetworking Operating System (IOS) to exclude a MIB, fooMIB, from read or write access using the community string "public", the following CLI commands would be used to configure a given managed network device.

snmp-server view restrictedview fooMIB excluded
snmp-server view restrictedview 1.3.6.1 included
snmp-server community public view restrictedview where 1.3.6.1 is the OID corresponding to "internet", the sub-tree from which all objects in Cisco routers are rooted. Therefore, one can include or exclude an entire object from access.

Often, there is a desire to restrict access based on a specific value of an object instance rather than restricting access to an entire MIB. For example, the MIB CISCO-CONFIG-COPY-MIB allows copying of configuration files to and from routers using tftp or ftp. One might want to deny Set requests for the ccCopySourceFileType object which takes the value of "tftp" or "ftp", thus allowing copying files from a router but not to a router.

SNMP lacks authentication capabilities, which results in vulnerability to a variety of security threats. Due to this security shortcoming of SNMP, many users do not implement Set operations, thereby reducing SNMP solely to a monitoring facility.

Based on the foregoing, there is a clear need for an improved mechanism for controlling access to network management information. Further, there is a specific need for such a mechanism in the context of the Simple Network Management Protocol.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for value-based access to network management information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

In one aspect, a process is disclosed in which a message is received requesting access to a set of managed objects associated with a network device. A set of object instances associated with the objects is retrieved, with associated values. An access policy is read. The access policy is associated with the requester and specifies restricted values associated with an object instance and includes instructions regarding whether to permit or deny access to the object instance when the object instance contains a specified restricted value. The current value of the object instance is compared to the specified restricted values. The requestor is permitted or denied access to the object instance based on the access policy. Significantly, value-based access to management information is provided.

In an embodiment, the access policy further specifies operator and restricted value combinations associated with the object instance. The combinations are compared with the current value to determine whether it meets the state of one of the combinations, and access is permitted or denied accordingly. Examples of operators, which can be represented as arithmetic operators or strings, include, but are not limited to, not equal, less than, greater than, less than or equal, greater than or equal.

In an embodiment, the managed objects are Management Information Bases (MIBs) and the commands are Simple Network Management Protocol (SNMP) commands.

In an embodiment, the process is performed by a network router. For example, the object instance may be associated with a MIB for copying configuration files from a router.

Operating Environment Example

Figure 1:
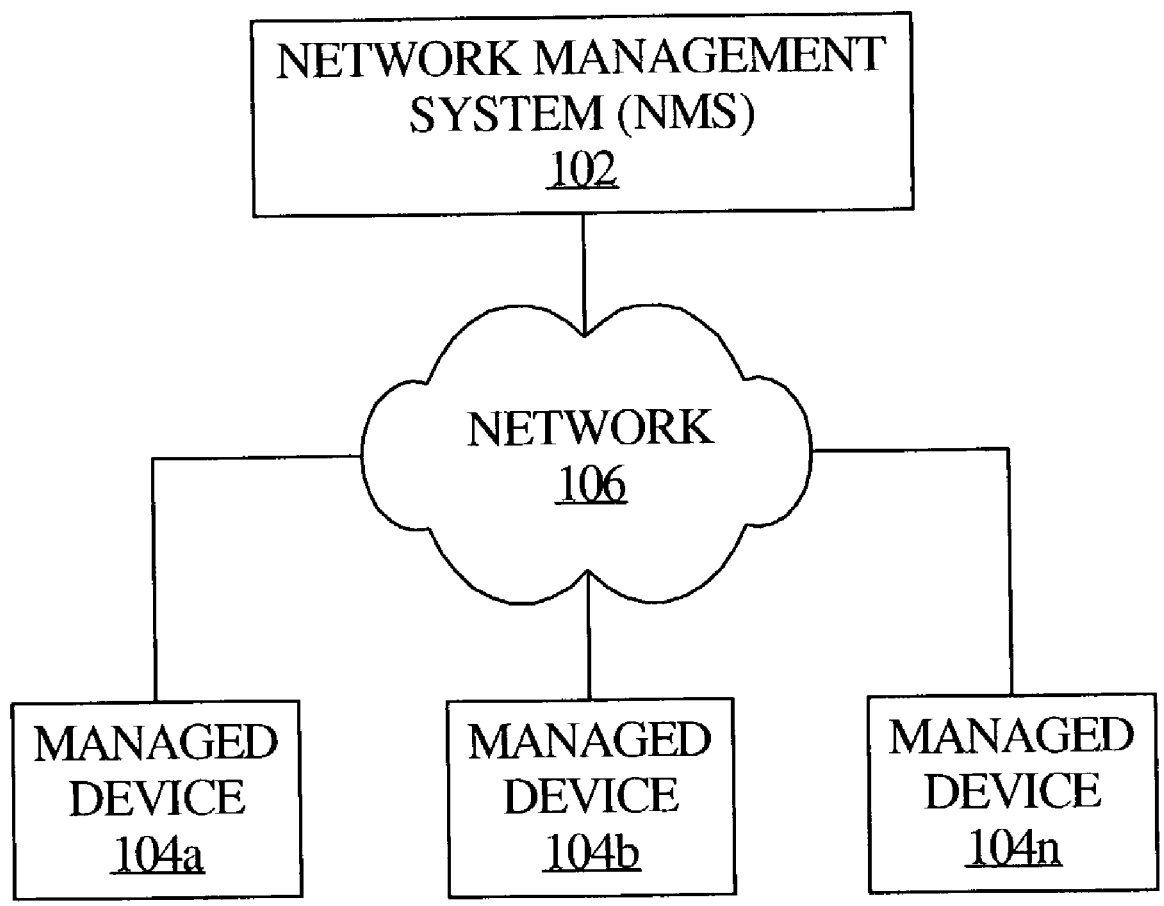
FIG. 1 is a block diagram of an example of a simple managed network, in which an embodiment may be implemented.

FIG. 1 is a block diagram of an example of a simple managed network 100, in which an embodiment may be implemented.

In the example managed network 100, a network management system (NMS) 102 is communicatively coupled to one or more managed devices 104a, 104b, 104n through a network 106. Network management system 102 is one or more applications, embodied as computer hardware, software, or more typically, a combination of computer hardware and software. For example, NMS 102 may take the form of a conventional computer or server running any of a number of network management applications. One or more NMSs 102 are present on each managed network 100.

NMS 102 monitors and controls managed devices 104a, 104b, 104n. Managed devices 104a, 104b, 104n are accessible via NMS 102. Further, information associated with and typically stored on managed devices 104a, 104b, 104n is accessible via NMS 102. NMS 102 includes one or more applications for accessing network information, network management information and network device information, applying a suitable network management protocol, for example, the Simple Network Management Protocol (SNMP).

NMS 102 is communicatively coupled to a packet-switched network 106 that may contain any number of network infrastructure elements including routers, switches, gateways, etc. Such elements are omitted from FIG. 1 for clarity, because they are not pertinent to the embodiments described herein. In one embodiment, network 106 is a TCP/IP network in which infrastructure elements execute a conventional routing protocol for routing packets among the infrastructure elements. For example, network 106 may take the form of the Internet or of a LAN (Local Area Network), implementing conventional technology such as Ethernet technology.

Figure 2:
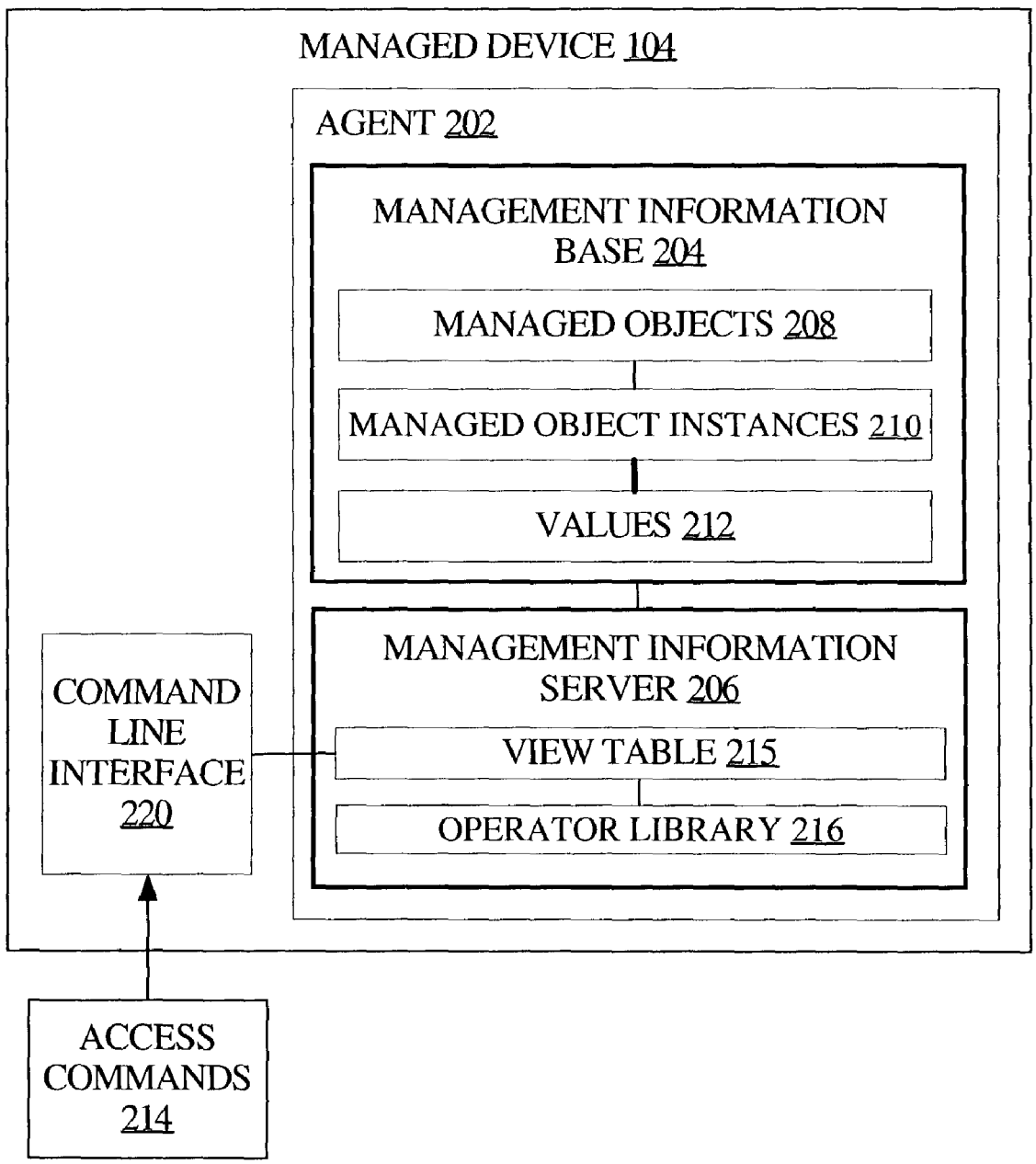
FIG. 2 is a block diagram of a managed device, illustrating elements involved in managing access to network management information.

Managed devices 104a, 104b, 104n are network nodes, whose pertinent functional components are described in more detail in reference to FIG. 2. Examples of managed devices 104a, 104b, 104n include, but are not limited to, routers, access servers, switches, gateways, bridges, hubs, computers, and printers. Managed devices 104a, 104b, 104n collect and store network management information and make this information available to one or more NMSs 102 using a suitable protocol.

For purposes of illustrating a clear example, limited numbers of managed devices are shown in FIG. 1. However, in a practical embodiment, there may be any number of such elements, and the use of hundreds or thousands of managed devices, such as routers, is specifically contemplated. Furthermore, although managed devices 104a, 104b, 104n are depicted as separate from network 106, practically, they are often considered constituent to network 106, or they are components of the internetwork of networks commonly referred to as the Internet, or of a LAN.

Managed Device Functional Components

FIG. 2 is a block diagram of a managed device, illustrating elements involved in managing access to network management information. Managed devices 104a, 104b, 104n are collectively referred to as managed device 104 in FIG. 2.

Managed device 104 comprises an agent 202, which has local knowledge of management information and facilitates remote access to that information. Agent 202 comprises a management information base (MIB) 204 and a management information server 206. MIB 204 is a collection of network management information, to which access is controlled via a network management protocol. An example of a network management protocol used for accessing MIB 204 is SNMP, however embodiments herein are not limited to use of SNMP to access the management information base 204 of managed device 104.

MIB 204 comprises one or more managed objects 208, managed object instances 210, and values 212. Each managed object 208 stores a value associated with a characteristic of managed device 104. Managed objects 208 may be implemented as object classes that can be developed for groups or types of related network entities or products that can be managed.

Managed objects 208 are associated with one or more object instances 210, which are essentially variables instantiated from the classes that define the managed objects 208. Each managed object instance 210 has a value 212, associated by a variable binding (varbind). Further, each value 212 associated with an object instance 210 represents a current state of a particular piece of management information about the managed device 104 in which the object instance is instantiated.

An example of a MIB, such as MIB 204, is CISCO-CONFIG-COPY-MIB, which allows copying of router configuration files to and from a router executing a particular operating system, using tftp or ftp. Such an operation is accomplished by issuing a series of Set requests to program the managed device with the proper parameters (e.g., source, destination, filename, tftp server's IP address, etc.). Further, an example of an associated managed object, such as object 208, is ccCopySourceFileType. When an object is instantiated into an object instance, such as managed object instance 210, it can take on a value, such as value 212. For example, an instance of ccCopySourceFileType can take the following values: tftp, tfp, rcp, iosFile, runningConfig, startupConfig.

Prior approaches to controlling access to network management information via a protocol such as SNMP provide access control only for an object 208 or object instance 210. For example, one's access to the object ccCopySourceFileType can be included or excluded through a series of SNMP commands. As is described in reference to FIG. 3, embodiments disclosed herein provide access control at the level of value 212, that is, value-based access to management information.

Agent 202 further comprises management information server 206, which is communicatively coupled to MIB 204 and which receives, interprets and executes management protocol commands, such as SNMP commands. The commands represent, among other things, (1) access policies with respect to management information, which are typically further associated with specific groups of requestors, and (2) requests for management information from requestors. Further, in response to requests, information server 206 serves management information to requesters that have been authorized to access the management information.

Upon receiving a request for particular management information from a given requestor, information server 206 references a view table 215, which stores representations of access commands 214, to determine whether the given requestor has been authorized to access the particular information. Typically, an administrator of a given managed device 104 provides a set of access commands 214 to the managed device 104, for example, SNMP view commands, through a command line interface 220. Further, the access commands 214 typically are parsed and stored in a table, such as view table 215. For example, view table 215 may include columns containing object identifiers (e.g., OIDs), operators, and restricted values. However, embodiments are not limited to storing access commands 214, or similar information that represents access policies with respect to network management information, in a table such as view table 215.

Each set of access commands 214 specifies one or more particular managed objects 208, one or more associated object instances 210, and an access group. An example of a set of SNMP access commands 214, as implemented in Cisco IOS CLI, follows.

snmp-server view restrictedview fooMIB excluded
    snmp-server view restrictedview 1.3.6.1 included
    snmp-server community public view restrictedview The foregoing series of commands excludes read and write access to an object called fooMIB when the "public" community string is used as the authentication string for accessing any OID containing fooMIB as its prefix.

In an embodiment, a set of access commands 214 specifies one or more restricted values associated with a given object instance from the managed object instances 210, to which a requester or group of requesters is permitted or denied access when the object instance contains the specified restricted value.

As a generalized example, the set of access commands 214 utilized in this context can take the following form:
    snmp-server view restrictedview <object name> <excluded/included> with value == <value>.

As an example of an implementation in Cisco IOS CLI, the set of SNMP access commands 214 utilized in this context can take the following form:
    snmp-server view restrictedview ccCopySourceFileType excluded with value == tftp
    snmp-server view restrictedview ccCopySourceFileType excluded with value == ftp
    snmp-server view restrictedview ccCopySourceFileType excluded with value == rcp
    snmp-server view restrictedview ccCopySourceFileType excluded with value == iosfile
    snmp-server view restrictedview 1.3.6.1 included
    snmp-server community public view restrictedview The foregoing set of commands excludes an object called ccCopySourceFileType from read or write access to the "public" community string when it contains a specified value (tftp, ftp, rcp, or iosfile). The effect of these commands is to exclude access to the network management information encapsulated in the specified object instance unless the source of the information is runningConfig or startupConfig, since these are the values that the object can take other than the values specifically excluded in the foregoing set of access commands. More specifically, the set of commands has the effect of allowing copying of configuration files from the given managed device 104, such as a router, while denying or excluding copying of configuration files to the given managed device 104.

The preceding example is but one of many specific implementations that the embodiment can take. Hence, embodiments are not limited to the preceding example or scenario, for those skilled in the art can implement the embodiments disclosed herein in any number of settings, with respect to any number of managed objects, values, management protocols, etc. Further, the specific command format may vary. Any format for specifying a restricted object and restricted values may be used.

In one embodiment, management information server 206 is further configured with an operator library 216. Operator library 216 includes operator functions for view-based access checking. Non-limiting examples of operators include Boolean operators, such as equal to, not equal to, less than, greater than, less than or equal, greater than or equal. These operators are used in the set of access commands 214 that are used to control access to management information as described above. Thus, rather than excluding access to an object instance 210 based solely on its current value equaling a given restricted value, more complex commands can be created which can regulate access to an object instance 210 based on the operators. That is, access to an object instance 210 can be excluded based on its current value in comparison with one or more operator/value combinations specified in access commands 214.

Support for such operators, in various network management system 102 (FIG. 1) implementations using various management protocols and running on various managed device operating systems, can be provided in both arithmetic form and/or string form. For example, if the particular OS in which operator extensions are implemented does not support arithmetic operators, such as "=", "!=", "<", ">", "<=", or ">=", strings can be used instead, such as "eq", "ne", "lt", "gt", "lte", and "gte", respectively.

Processes for Managing Access to Network Management Information

Figure 3:
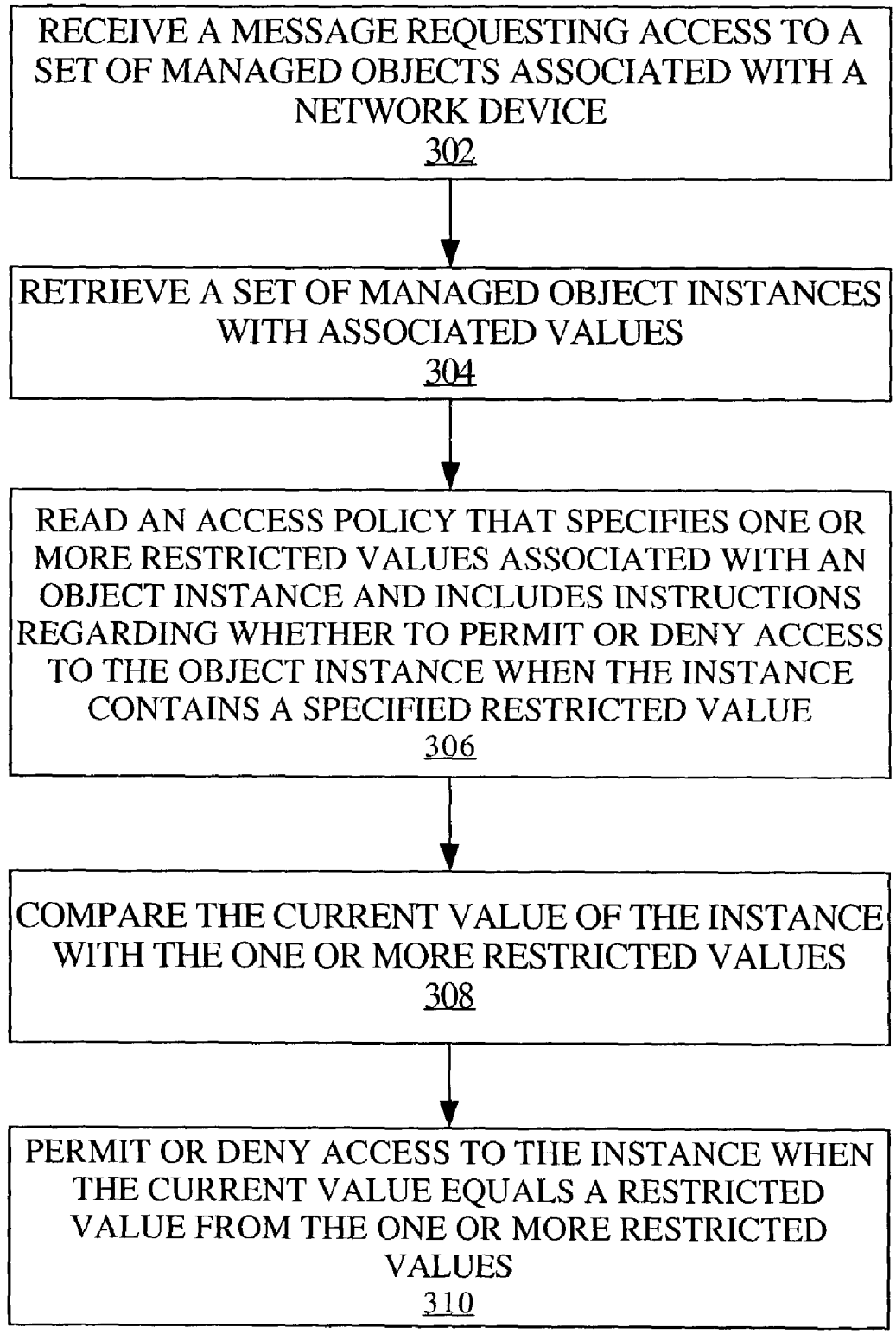
FIG. 3 is a flow diagram illustrating a process for managing access to network management information.

FIG. 3 is a flow diagram illustrating a process for managing access to network management information.

At block 302, a message is received requesting access to a set of one or more managed objects, such as managed objects 208 or managed object instances 210 (FIG. 2), associated with a network device, such as managed device 104 (FIG. 1). In effect, the request is requesting access to management information encapsulated in the one or more objects. A requester can remotely submit such a request to a managed device via a suitable protocol, such as SNMP, via a network management system, such as NMS 102 (FIG. 1).

At block 304, a set of one or more managed object instances is retrieved, such as object instances 210, along with their respective values, such as values 212 (FIG. 2). Each object instance retrieved is associated with an object from the set of objects requested at block 302. For example, object instances and values can be retrieved from a local management information base, such as MIB 204 (FIG. 2), at the managed device 104.

Prior to responding to the request received at block 302, at block 306 an access policy is read. For example, the access policy may be a representation of commands, such as access commands 214 (FIG. 2), read from a look-up table that stores view information in association with one or more OIDs. The access policy is associated with the requester or a group with which the requester is associated. Furthermore, the commands specify one or more restricted values associated with an object instance from the set of object instances. Each restricted value represents a possible state of its respective object instance, where access to the respective object instance is permitted or denied when the state of the object instance equals a value from the one or more restricted values specified in the set of commands. That is, access to the requested object instance is permitted or denied when the instance currently contains a restricted value specified in the access commands and associated access policy.

In an embodiment, the one or more managed objects to which an access request is received at block 302 are SNMP MIBs, and the access policy read at block 306 is a representation of SNMP commands.

Continuing to block 308, the current value of the object instance is compared to the one or more restricted values specified in the access policy read at block 306. At block 310, access to the object instance by the requester is permitted or denied, according to the access policy, when the current value of the instance equals a restricted value from the one or more restricted values specified in the access policy. Furthermore, just as access can be denied when a value is matched, conversely, access can be included or granted only if a value is matched.

Hence, managing access to network management information may be performed based on the current value of an object associated with the requested management information. In an embodiment, a requester may be permitted to access to object instances other than the object instance, because access and restriction thereof is based on a specific value of an object instance. Implementing the techniques described herein may be performed in one or more computer programs or other software elements by appropriated programming. For example, the extended value-based access capability described herein can be integrated into an existing "snmp-server view" command function or similar functioning commands of server 206 (FIG. 2), which configure value-based access rights for object instances, as well as into routines of an operating system, agent, or other application utilized by a managed device such as a router to perform view-based checking.

In an embodiment, and as described above in reference to the operator library 216 of FIG. 2, the access policy read at block 306 is based on commands that further specify one or more operator and restricted value combinations associated with an object instance from the set of object instances. A requester is denied access to the respective object instance when the state of the object instance meets a condition represented by an operator/value combination from the one or more combinations specified in the set of commands. That is, upon a comparison of the current value of the object instance with the one or more operator/value combinations, access to the requested object instance is permitted or denied when the instance currently contains a value that meets an operator/value combination. For example, access to an object instance may be denied when the current value of the object is greater than or equal to a restricted value specified in the set of commands. Similarly, access to a requested object instance may be included or granted based on its current value.

In a related embodiment, the operators from the one or more operator/value combinations are chosen from a set of operators consisting of "not equal," "less than," "greater than," "less than or equal," and "greater than or equal." Implementations of this embodiment are not limited to these operators, for other operators are contemplated. Furthermore, implementations may represent each operator as an arithmetic operator, e.g., "<=", or as a string, e.g., "lte".

The techniques described herein can provide greater power to restrict illegal accesses to a managed network device, such as a router. Further, if problems with managed object implementations, such as MIBs, are identified (e.g., object is not checking string length and thus allowing buffer overruns and device crashes), a workaround can be developed for images already installed and operating in the field. Hence, the need to rebuild released images or deliver specialized engineering releases with respect to the particular managed object is reduced or eliminated.

Implementation Mechanisms—Hardware Overview

Figure 4:
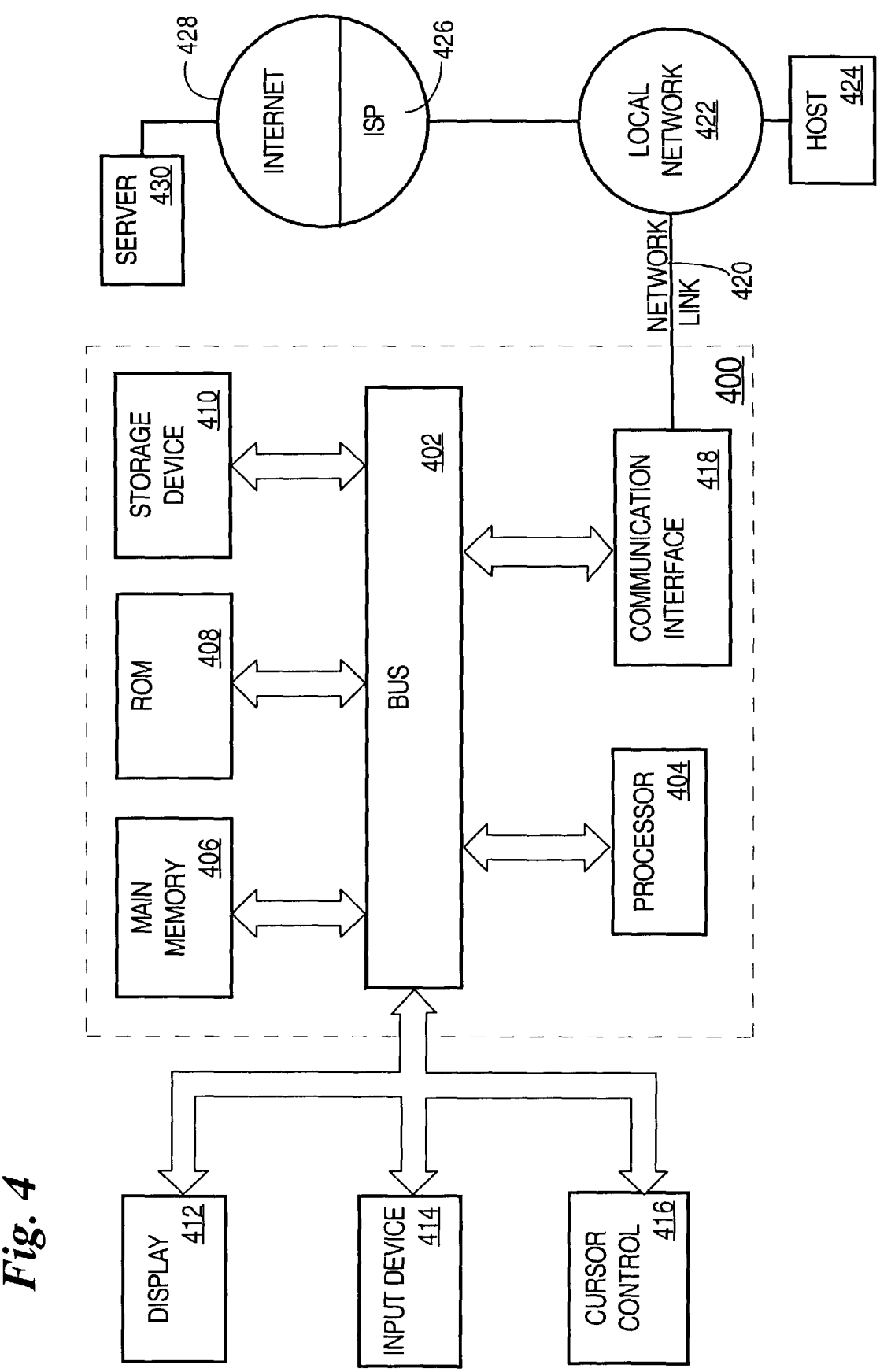
FIG. 4 is a block diagram that illustrates a computer system upon which an embodiment may be implemented.

FIG. 4 is a block diagram that illustrates a computer system 400 upon which an embodiment of the invention may be implemented. Embodiments are implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

Embodiments are related to the use of computer system 400 for providing value-based access to network management information. According to one embodiment, access to network management information is managed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for value-based management of network management information as described herein.

The received code may be executed by processor 404 as it is received, and/or stored in storage device 410, or other non-volatile storage for later execution. In this manner, computer system 400 may obtain application code in the form of a carrier wave.

What is claimed is:

1. A method for managing access to network management information associated with a network device, the method comprising the computer-implemented steps of:
    receiving from a requestor a message requesting access to a set of one or more managed objects associated with the network device wherein the network device comprises a network node and the managed objects are stored in a management information base (MIB) of a network management information system agent in the network device;
    retrieving a set of one or more managed object instances with associated values, wherein each object instance is associated with an object from the set of managed objects;
    reading an access policy associated with the requester, wherein the access policy specifies one or more restricted values associated with an object instance and includes instructions regarding whether to permit or deny access to the object instance when the object instance contains a specified restricted value;
    comparing a current value of the object instance with the one or more restricted values; and
    controlling access to the object instance based on the current value;
    wherein the current value comprises one or more of:
    a correspondence with a given restricted value; or
    a comparison with one or more operator values.

2. The method of claim 1, further comprising the step of:
    denying the requester access to the object instance when the current value equals a restricted value from the one or more restricted values.

3. The method of claim 2, further comprising the step of:
    permitting the requester access to object instances other than the object instance.

4. The method of claim 1, further comprising the step of:
    permitting the requester access to the object instance only when the current value equals a restricted value from the one or more restricted values.

5. The method of claim 1, wherein a set of commands further specifies one or more operator and restricted value combinations associated with the object instance and includes instructions regarding whether to permit or deny access to the object instance when the object instance contains a specified restricted value in a state that meets an operator and restricted value combination from the one or more combinations, the method comprising the step of:
    comparing the current value of the object instance with the one or more operator and restricted value combinations.

6. The method of claim 5, further comprising the step of:
    denying the requester access to the object instance when the current value is in a state that meets an operator and restricted value combination from the one or more combinations.

7. The method of claim 5, further comprising the step of:
    permitting the requester access to the object instance only when the current value is in a state that meets an operator and restricted value combination from the one or more combinations.

8. The method of claim 5, wherein the operators from the one or more combinations are chosen from a set of operators consisting of not equal, less than, greater than, less than or equal, and greater than or equal.

9. The method of claim 8, wherein the operators from the set of operators are represented as arithmetic operators, and wherein the step of choosing is based on the set of arithmetic operators.

10. The method of claim 8, wherein the operators from the set of operators are represented as strings, and wherein the step of choosing is based on the set of strings.

11. The method of claim 1, wherein the one or more managed objects are MIBs and the access policy includes Simple Network Management Protocol commands, and wherein the steps of receiving the message and reading the access policy are based on the MIBs and Simple Network Management Protocol commands.

12. The method of claim 1, wherein the computer-implemented steps are performed by a network router.

13. The method of claim 12, wherein the computer-implemented steps are performed based on a managed object that is associated with copying one or more router configuration files and an object instance that is associated with the managed object.

14. A method for managing access to network router information from one or more Management Information Bases (MIBs) using the Simple Network Management Protocol, the method comprising the computer-implemented steps of:
    receiving from a requestor an SNMP message requesting access to a set of one or more MIB objects of a management information system agent in the router wherein the router comprises a network node;

retrieving a set of one or more MIB object instances with their associated values, wherein each MIB object instance is associated with a MIB object from the set of MIB objects;

reading a set of one or more commands that configure value-based access rights for MIB object instances, wherein the set of commands specifies one or more restricted values associated with a MIB object instance from the set of MIB object instances and includes instructions regarding whether to permit or deny access to the MIB object instance when the MIB object instance contains a specified restricted value;

comparing a current value of the MIB object instance with the one or more restricted values; and controlling access to the object instance based on the current value;

wherein the current value comprises one or more of:
a correspondence with a given restricted value; or
a comparison with one or more operator values.

15. The method of claim 14, further comprising the step of:
denying the requester access to router information contained in the MIB object instance when the current value equals a restricted value from the one or more restricted values.

16. The method of claim 15, further comprising the step of:
permitting the requester access to router information contained in the MIB object instances other than the MIB instance.

17. The method of claim 14, further comprising the step of:
permitting the requester access to router information contained in the MIB object instance only when the current value equals a restricted value from the one or more restricted values.

18. The method of claim 14, wherein the set of commands further specifies one or more operator and restricted value combinations associated with the MIB object instance and includes instructions regarding whether to permit or deny access to the MIB object instance when the MIB object instance contains a specified value in a state that meets a Boolean operator and restricted value combination from the one or more combinations, the method comprising the step of:
comparing the current value of the MIB object instance with the one or more Boolean operator and restricted value combinations.

19. The method of claim 18, further comprising the step of:
denying the requester access to router information contained in the MIB object instance when the current value is in a state that meets a Boolean operator and restricted value combination from the one or more combinations.

20. A computer-readable tangible storage medium carrying one or more sequences of instructions for managing access to network management information associated with a network device, which instructions, when executed by one or more processors, cause the one or more processors to carry out the steps of:
receiving from a requester a message requesting access to a set of one or more managed objects associated with the network device wherein the network device comprises a network node and wherein the managed objects are stored in a management information base (MIB) of an network management information system agent in the network device;

retrieving a set of one or more managed object instances with associated values, wherein each object instance is associated with an object from the set of managed objects;

reading an access policy associated with the requester, wherein the access policy specifies one or more restricted values associated with an object instance and includes instructions regarding whether to permit or deny access to the object instance when the object instance contains a specified restricted value;

comparing a current value of the object instance with the one or more restricted values; and controlling access to the object instance is based on the current value;

wherein the current value comprises one or more of:
a correspondence with a given restricted value; or
a comparison with one or more operator values.

21. The computer-readable medium of claim 20, wherein execution of the instructions by one or more processors causes the one or more processors to carry out the step of:
denying the requester access to the object instance when the current value equals a restricted value from the one or more restricted values.

22. The computer-readable medium of claim 21, wherein execution of the instructions by one or more processors causes the one or more processors to carry out the step of:
permitting the requester access to object instances other than the object instance.

23. The computer-readable medium of claim 20, wherein execution of the instructions by one or more processors causes the one or more processors to carry out the step of:
permitting the requester access to the object instance only when the current value equals a restricted value from the one or more restricted values.

24. The computer-readable medium of claim 20, wherein the access policy further specifies one or more operator and restricted value combinations associated with the object instance and includes instructions regarding whether to permit or deny access to the object instance when the object instance contains a specified restricted value in a state that meets an operator and restricted value combination from the one or more combinations, the one or more sequences of instructions causing the one or more processors to carry out the step of:
comparing the current value of the object instance with the one or more operator and restricted value combinations.

25. The method of claim 24, wherein execution of the instructions by one or more processors causes the one or more processors to carry out the step of:
denying the requester access to the object instance when the current value is in a state that meets an operator and restricted value combination from the one or more combinations.

26. The method of claim 24, wherein execution of the instructions by one or more processors causes the one or more processors to carry out the step of:
permitting the requester access to the object instance only when the current value is in a state that meets an operator and restricted value combination from the one or more combinations.

27. The computer-readable medium of claim 20, wherein the one or managed objects are MIBs and the access policy includes Simple Network Management Protocol commands, and wherein the one or more sequences of instructions cause the one or more processors to carry out the steps of receiving the message and reading the access policy based on the MIBs and Simple Network Management Protocol commands.

28. The computer-readable medium of claim 20, wherein the one or more sequences of instructions cause the one or more processors to carry out the steps based on a managed object that is associated with copying one or more router configuration files and an object instance that is associated with the managed object.

29. A computer-readable tangible storage medium carrying one or more sequences of instructions for managing access to network router information from at least one Management Information Base (MIB) using the Simple Network Management Protocol (SNMP), which instructions, when executed by one or more processors, cause the one or more processors to carry out the steps of:
receiving from a requestor an SNMP message requesting access to a set of one or more MIB objects of a management information system agent in the router wherein the router comprises a network node;
retrieving a set of one or more MIB object instances with their associated values, wherein each MIB object instance is associated with a MIB object from the set of MIB objects;
reading a set of one or more commands that configure value-based access rights for MIB object instances, wherein the set of commands specifies one or more restricted values associated with a MIB object instance from the set of MIB object instances and includes instructions regarding whether to permit or deny access to the MIB object instance when the MIB object instance contains a specified restricted value;
comparing a current value of the MIB object instance with the one or more restricted values; and
controlling access to the object instance based on the current value;
wherein the current value comprises one or more of:
a correspondence with a given restricted value; or
a comparison with one or more operator values.

30. The computer-readable medium of claim 29, wherein the one or more sequences of instructions cause the one or more processors to carry out the step of:
denying the requester access to router information contained in the MIB object instance when the current value equals a restricted value from the one or more restricted values.

31. The computer-readable medium of claim 30, wherein the one or more sequences of instructions cause the one or more processors to carry out the step of:
permitting the requester access to router information contained in the MIB object instances other than the MIB object instance.

32. The computer-readable medium of claim 29, wherein the one or more sequences of instructions cause the one or more processors to carry out the step of:
permitting the requester access to router information contained in the MIB object instance only when the current value equals a restricted value from the one or more restricted values.

33. The computer-readable medium of claim 29, wherein the set of commands further specifies one or more operators and restricted value combinations associated with the MIB object instance and includes instructions regarding whether to permit or deny access to the MIB object instance when the object instance contains a specified restricted value in a state that meets a Boolean operator and restricted value combination from the one or more combinations, and wherein the one or more sequences of instructions cause the one or more processors to carry out the steps of:
comparing the current value of the MIB object instance with the one or more Boolean operator and restricted value combinations.

34. The computer-readable medium of claim 33, wherein the one or more sequences of instructions cause the one or more processors to carry out the step of:
denying the requester access to router information contained in the MIB instance when the current value is in a state that meets a Boolean operator and restricted value combination from the one or more combinations.

35. An apparatus for managing access to network management information associated with a network device, comprising:
means for receiving from a requestor a message requesting access to a set of one or more managed objects associated with the network device wherein the network device comprises a network node and wherein the managed objects are stored in a management information base (MIB) of an network management information system agent in the network device;
means for retrieving a set of one or more managed object instances with associated values, wherein each object instance is associated with an object from the set of managed objects;
means for reading an access policy associated with the requester, wherein the access policy specifies one or more restricted values associated with an object instance and includes instructions regarding whether to permit or deny access to the object instance when the object instance contains a specified restricted value;
means for comparing a current value of the object instance with the one or more restricted values; and
means for controlling access to the object instance based on the current value;
wherein the current value comprises one or more of:
a correspondence with a given restricted value; or
a comparison with one or more operator values.

36. The apparatus of claim 35, further comprising:
means for denying the requester access to the object instance when the current value equals a restricted value from the one or more restricted values.

37. The apparatus of claim 36, further comprising:
means for permitting the requester access to object instances other than the object instance.

38. The apparatus of claim 35, further comprising:
means for permitting the requester access to the object instance only when the current value equals a restricted value from the one or more restricted values.

39. A network device that manages access to network management information, the network device comprising:
a network interface;
a processor coupled to the network interface and receiving network messages from the network through the network interface;
a computer-readable medium comprising one or more stored sequences of instructions which, when executed by the processor, cause the processor to carry out the steps of:
receiving from a requestor a message requesting access to a set of one or more managed objects associated with the network device wherein the network device comprises a network node and wherein the managed objects are stored in a management information base (MIB) of an network management system agent in the network device;

retrieving a set of one or more managed object instances with associated values, wherein each object instance is associated with an object from the set of managed objects;

reading an access policy associated with the requestor and that specifies one or more restricted values associated with an object instance from the set of object instances to which the requestor is denied access when the object instance contains a specified restricted value;

comparing a current value of the object instance with the one or more restricted values; and controlling access to the object instance is based on the current value;

wherein the current value comprises one or more of:
   a correspondence with a given restricted value; or
   a comparison with one or more operator values.

40. The network device of claim 39, wherein the sequences of instructions which, when executed by the processor, cause the processor to carry out the further step of:
   denying the requester access to the object instance when the current value equals a restricted value from the one or more restricted values.

41. The network device of claim 40, wherein the sequences of instructions which, when executed by the processor, cause the processor to carry out the further step of:
   permitting the requester access to object instances other than the object instance.

42. The network device of claim 39, wherein the sequences of instructions which, when executed by the processor, cause the processor to carry out the further step of:
   permitting the requester access to the object instance only when the current value equals a restricted value from the one or more restricted values.

43. The network device as recited in claim 39 wherein a set of commands further specifies one or more operator and restricted value combinations associated with the object instance and includes instructions regarding whether to permit or deny access to the object instance when the object instance contains a specified restricted value in a state that meets an operator and restricted value combination from the one or more combinations and wherein the sequences of instructions, when executed by the processor, cause the processor to carry out the further step of:
   comparing the current value of the object instance with the one or more operator and restricted value combinations.

44. The network device as recited in claim 43 wherein the sequences of instructions, when executed by the processor, cause the processor to carry out the further step of:
   denying the requester access to the object instance when the current value is in a state that meets an operator and restricted value combination from the one or more combinations.

45. The network device as recited in claim 43, wherein the sequences of instructions, when executed by the processor, cause the processor to carry out the further step of:
   permitting the requester access to the object instance only when the current value is in a state that meets an operator and restricted value combination from the one or more combinations.

46. The network device as recited in claim 43 wherein the operators from the one or more combinations are chosen from a set of operators consisting of not equal, less than, greater than, less than or equal, and greater than or equal.

47. The network device as recited in claim 43 wherein the operators from the set of operators are represented as arithmetic operators, and wherein the step of choosing is based on the set of arithmetic operators.

48. The network device as recited in claim 43 wherein the operators from the set of operators are represented as strings, and wherein the step of choosing is based on the set of strings.

49. The network device as recited in claim 39 wherein the one or more managed objects comprise MIBs and the access policy comprises Simple Network Management Protocol (SNMP) commands, and wherein the processor performs the steps of receiving the message and reading the access policy based on the MIBs and SNMP commands.

50. The network device as recited in claim 39 wherein the network device comprises at least one of a network node, a router, a switch, a hub and a bridge.

51. The network device as recited in claim 50 wherein the processor performs the steps based on a managed object that is associated with copying one or more configuration files associated with the network device and an object instance that is associated with the managed object.

52. The network device as recited in claim 39 wherein the managed object instances retrieved comprise variables that are instantiated from one or more classes that define the managed objects and wherein the values represent a current state of particular data descriptive of the network device.

53. The network device as recited in claim 39 wherein the reading an access policy associated with the requestor comprises reading the access policy from a view table component of a management information server disposed within the agent.

54. The method as recited in claim 1 wherein the managed object instances retrieved comprise variables that are instantiated from one or more classes that define the managed objects and wherein the values represent a current state of particular data descriptive of the network device.

55. The method as recited in claim 1 wherein the reading an access policy associated with the requestor comprises reading the access policy from a view table component of a management information server disposed within the agent.

56. The method as recited in claim 14 wherein the managed object instances retrieved comprise variables that are instantiated from one or more classes that define the managed objects and wherein the values represent a current state of particular data descriptive of the network device.

57. The method as recited in claim 14 wherein the reading an access policy associated with the requestor comprises reading the access policy from a view table component of a management information server disposed within the agent.

58. The computer readable medium as recited in claim 20 wherein the managed object instances retrieved comprise variables that are instantiated from one or more classes that define the managed objects and wherein the values represent a current state of particular data descriptive of the network device.

59. The computer readable medium as recited in claim 20 wherein the reading an access policy associated with the requestor comprises reading the access policy from a view table component of a management information server disposed within the agent.

60. The computer readable medium as recited in claim 29 wherein the managed object instances retrieved comprise variables that are instantiated from one or more classes that define the managed objects and wherein the values represent a current state of particular data descriptive of the network device.

61. The computer readable medium as recited in claim 29 wherein the reading an access policy associated with the requestor comprises reading the access policy from a view table component of a management information server disposed within the agent.

62. The apparatus as recited in claim 35 wherein the managed object instances retrieved comprise variables that are instantiated from one or more classes that define the managed objects and wherein the values represent a current state of particular data descriptive of the network device.

63. The apparatus as recited in claim 35 wherein the means for reading an access policy associated with the requestor comprise means for reading the access policy from a view table component of a management information server disposed within the agent.

* * * * *